Figure 3:
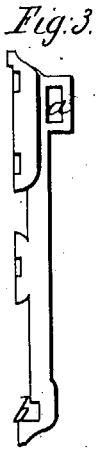
Figure 2:
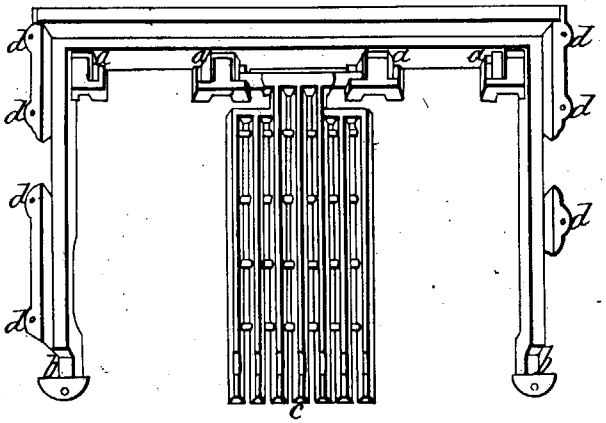
Figure 4:
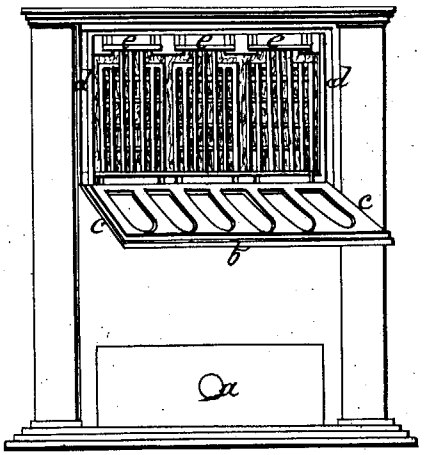
Figure 1:
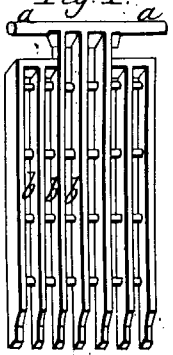

7636X

E. Nott,

Grate.

Patented June 22. 1833.

NO PRINTED SPECIFICATION AVAILABLE

Eliphalet Nott.

Case "2."

Letters Patent.

The Schedule referred to in these Letters Patent and making part of the same, containing a description in the words of the said Eliphalet Nott, himself of his improvement, in the construction of <u>sashes</u> for mica in the front of Coal stoves.

---

Case No. 2.

Specification of an improvement made in the material used in the construction of the sash for containing laminated mica when employed in illuminating the front of an Anthracite coal stove. Whereas inconvenience has arisen from the warping and sullying of said sash, when formed, in whole or in part of copper or other sheet material, therefore an improvement has been attempted, by constructing the same of cast iron, a cheaper and less elastic material, which improvement having been perfected and tested by repeated experiments, is now deemed worthy of being carried into general use. In executing this improvement two separate cast iron frames divided into squares, or other figures by an equal number of corresponding bars; to wit. a front frame, and a back frame are [illegible] together in such manner that the bars of the one frame, correspond to the bars of the other frame. and in such manner that sufficient space is furnished between the corresponding bars on one side of each square, for the insertion of a sheet of laminated mica or other lamina through which light can be transmitted, and [illegible] said corresponding bars on the other three sides, for receiving and retaining the same in place when inserted - which may be provided for, by thinning the whole face of the upper bar of each square contained in the back frame, and the inner margin of the face of the other three bars. The bars employed in the construction of these frames should in a common sized stove be about three sixteenths of an inch

[illegible] 7636X inch thick, and about half an inch wide, and when combined of any convenient external form, though an architectural one is preferred. For further information, reference must be had to the drawings & explanations hereunto appended.

<u>Summary</u>

The improvement above contemplated, consists in making use of <u>cast iron</u>, in place of <u>sheet iron</u>, or other sheet material, in constructing in the front of an Anthracite coal stove, the [illegible] for containing laminated mica, or other lamina through which light may be transmitted, <u>except the rivets made use of in combining the front and back thereof</u>. I therefore claim as my invention and improvement, the making use of cast iron as aforesaid in constructing in the front of an anthracite coal stove, a sash for containing laminated mica, or other lamina as aforesaid; together with the uses to which the same has been, or may hereafter be applied in stoves or furnaces of any sort.

Exd. Witnesses
MJC G. F. Yates
D. Boyd

Eliphalet Nott 1516 words (Granted June 29. 1833)
(Dr in Portfolio)